(12) United States Patent
Cope et al.

(10) Patent No.: US 7,443,976 B2
(45) Date of Patent: *Oct. 28, 2008

(54) INFORMATION CORRELATION SYSTEM

(75) Inventors: Warren B. Cope, Olathe, KS (US); Ramaswami Rangarajan, Belmont, CA (US); Jonathan E. Schaff, San Leandro, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/417,378

(22) Filed: May 4, 2006

(65) Prior Publication Data

US 2006/0203990 A1      Sep. 14, 2006

Related U.S. Application Data

(63) Continuation of application No. 10/642,863, filed on Aug. 18, 2003, now Pat. No. 7,076,050.

(51) Int. Cl.
*H04M 3/00* (2006.01)

(52) U.S. Cl. .............................. 379/265.02; 379/265.01
(58) Field of Classification Search .................................
379/265.01–265.14, 127.01–127.06
See application file for complete search history.

(56) References Cited

U.S. PATENT DOCUMENTS

| 7,106,848 B1* | 9/2006 | Barlow et al. ........... 379/212.01 |
| 2002/0034290 A1* | 3/2002 | Pershan .................. 379/207.02 |

\* cited by examiner

*Primary Examiner*—William J Deane

(57) ABSTRACT

A communication system receives a call to a called number. The called number includes a destination number and a correlation code. The communication system routes the call to a destination based on the destination number but not based on the correlation code. The communication system transfers the correlation code to the destination with the call. The communication system receives a query from the destination indicating the correlation code. In response to the query, the communication system retrieves information from a database using the correlation code and transfers the information to the destination.

20 Claims, 6 Drawing Sheets

US 7,443,976 B2

INFORMATION CORRELATION SYSTEM

RELATED APPLICATIONS

This patent application is a continuation of U.S. patent application Ser. No. 10/642,863; filed on Aug. 18, 2003 now U.S. Pat. No. 7,076,050; entitled "INFORMATION CORRELATION SYSTEM;" and hereby incorporated by reference into this patent application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to a communication system and method for correlating information.

2. Description of the Prior Art

An enormous number of calls are placed daily from callers to call centers that provide customer support services. Currently, network configurations that support the customer support services include service platforms, interactive voice response units (IVRs), automatic call distributors (ACDs), live agents at a call center that interact with callers, and computers with customer databases. Of the many calls placed each day destined for call centers, a large number are handled automatically by the IVRs and other similar communications equipment. Often times, an IVR prompts the caller for information such as a social security number or a service requested by the caller. Based upon the caller entered information, the call is redirected to a live call agent. After the call is transferred, the live call agent frequently must re-prompt the caller for the previously entered information because the information was lost during the transfer.

One method employed to retain the information includes associating the information in a database with a unique transfer number typically comprising a toll-free 800 number. While the call is connected to the IVR through a service platform, the caller provides information over the call to the IVR. As a part of the call transfer, the IVR sends the information to a database system along with the 800 number for the call. Then, the IVR initiates a call transfer through the service platform using the 800 number. The service platform tears down the call leg to the IVR and out-dials the toll-free 800 number. A routing system such as a network switch in the public service telephone network (PSTN) receives the out-dialed 800 number and transfers the call from the service platform to a call center with a live agent wherein the call center is associated with the 800 number.

At the live agent location, the transfer is received with the 800 number out-pulsed as dialed number information service (DNIS) digits from the network switch. Upon receiving the call transfer, a query indicating the 800 number is sent from the live agent location to the database system. The database system retrieves the information stored in association with the 800 number and transfers the information to the receiving system.

While this method allows the live call agent to access the caller entered information rather than re-prompting the caller for the information, it problematically requires unique 800 numbers for each individual call. Provisioning pools of 800 numbers to provide adequate call capacity to a system is expensive, resource intensive, and inefficient. A solution is therefore desired that more effectively and efficiently correlates data for a call between two call destinations.

SUMMARY OF THE INVENTION

The invention helps solve the above problems with technology that improves information correlation for a call. Examples of the invention include a communication system and its method of operation. The communication system comprises a call processing and routing system and a data system. The call processing and routing system is configured to receive a call to a called number that includes a destination number and a correlation code, route the call to a destination based on the destination number but not based on the correlation code, and transfer the correlation code to the destination with the call. The data system is configured to receive a query from the destination indicating the correlation code, and in response to the query, retrieve information from a database using the correlation code and transfer the information to the destination.

In some examples of the invention, the destination number comprises a ten digit telephone number and the correlation code comprises a number appended to the destination number.

In some examples of the invention, the destination number comprises a ten digit telephone number and the correlation code comprises a four digit number appended to the destination number.

In some examples of the invention, the destination number comprises an 800 number.

In some examples of the invention, the call processing and routing system is configured to transfer the correlation code to the destination with the call by transferring Dialed Number Information Service (DNIS) digits to the destination over the call.

In some examples of the invention, the destination comprises a live operator

In some examples of the invention, an interactive voice response unit is configured to collect the information from a caller placing the call.

In some examples of the invention, the data system is configured to store the information in the database in association with the correlation number.

In some examples of the invention, the call processing and routing system is configured to receive the call from a calling system that comprises an interactive voice response unit.

In some examples of the invention, the call processing and routing system is configured to receive the call from a prior destination that is transferring the call.

BRIEF DESCRIPTION OF THE DRAWINGS

The same reference number represents the same element on all drawings.

DETAILED DESCRIPTION OF THE PREFERRED EMBODIMENT

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
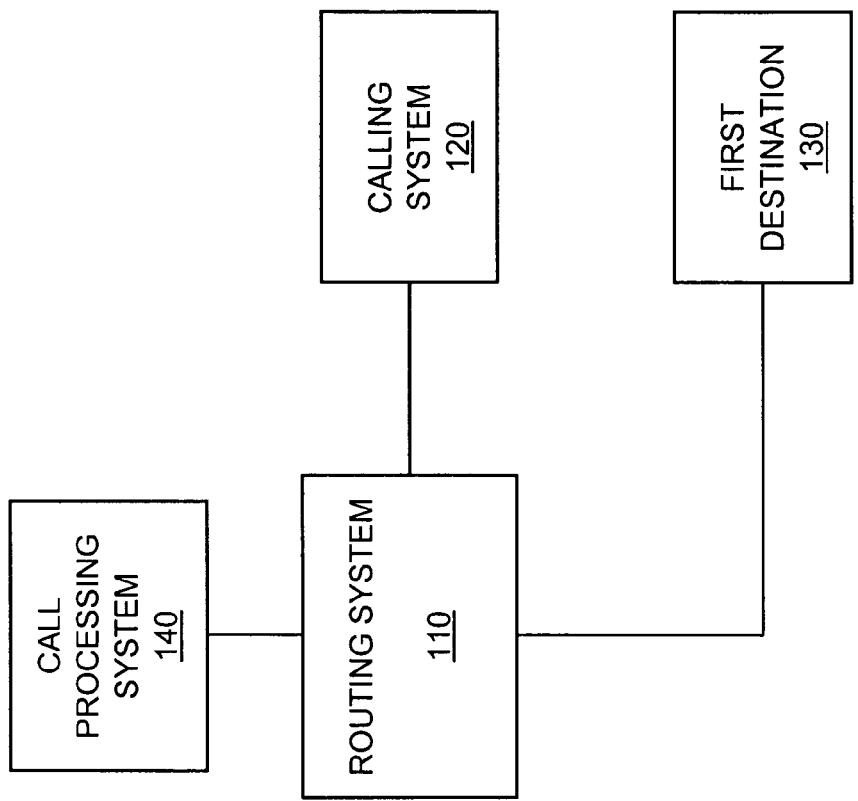
FIG. 1 illustrates an information correlation system in an example of the invention.
Figure 2:
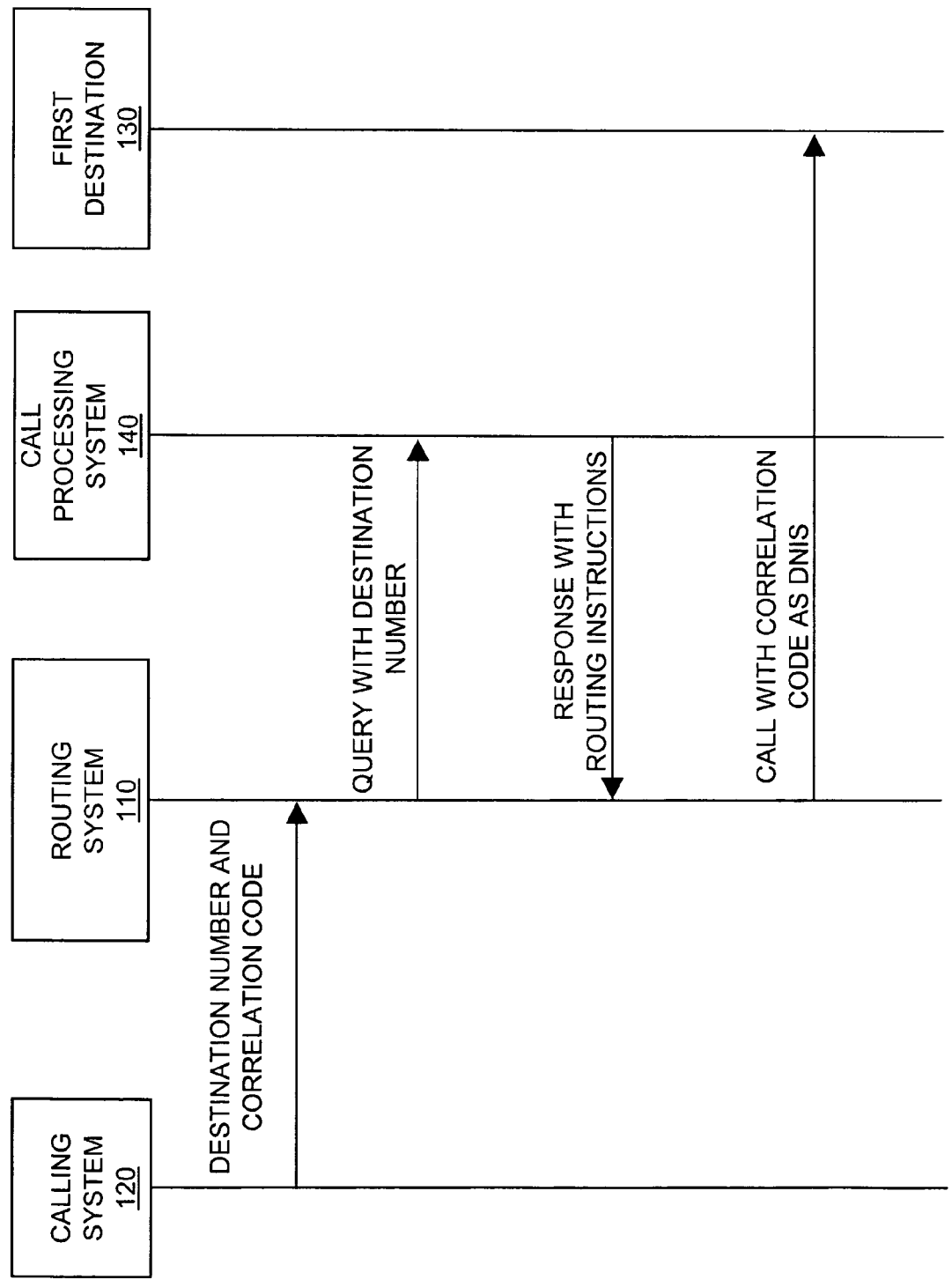
FIG. 2 illustrates the operation of an information correlation system in an example of the invention.

First Example Configuration and Operation—FIGS. 1-2

FIG. 1 illustrates information correlation system 100 in an example of the invention. Routing system 110 is connected to call processing system 140, calling system 120, and first destination 130. Routing system 110 could include a collection of Public Switched Telephone Network (PSTNs) elements such as a telecommunication switch. Call processing system 140 comprises a Service Control Point (SCP) or similar processing system. Calling system 120 comprises an interactive voice response unit (IVR). First destination 130 comprises an automatic call distribution system (ACD) including a live operator.

FIG. 2 illustrates the operation of information correlation system 100 in an example of the invention. Calling system 120 transfers a destination number and a code for correlating information entered over a call to routing system 110. Routing system 110 receives the destination number and code and responsively transfers a query including the destination number to call processing system 140. Call processing system 140 receives the query and processes the destination number to determine routing instructions for the call. Call processing system 140 does not process the code to determine the routing instructions. Call processing system 140 then transfers a query response to routing system 110 wherein routing system 110 routes the call to first destination 130. Routing system 110 also out-pulses the code as DNIS to first destination 130. Routing system 110 could out-pulse the destination number with the code to first destination 130. First destination 130 receives the call and the code and uses the code to access the information entered over the call.

Figure 3:
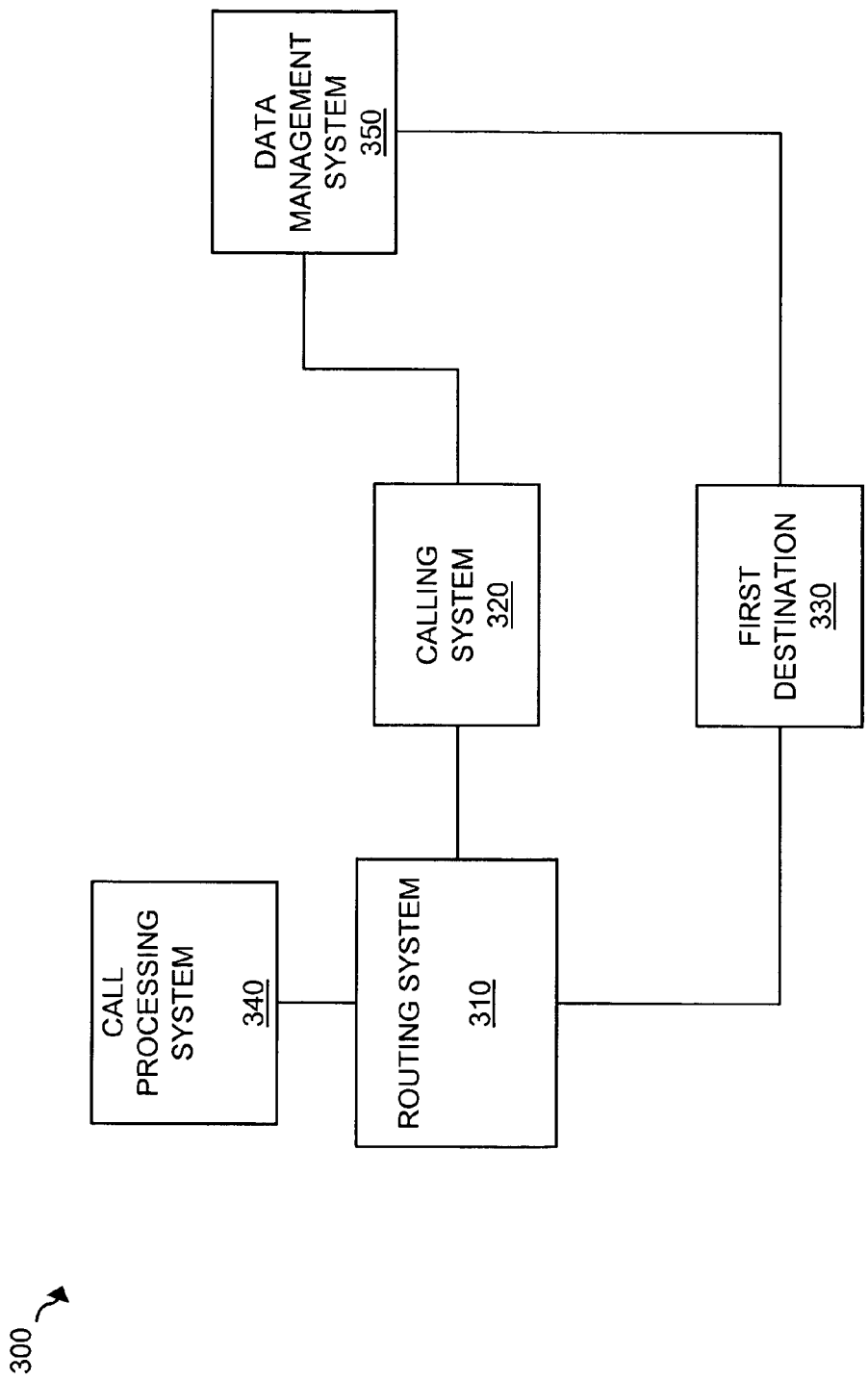
FIG. 3 illustrates an information correlation system in an example of the invention.
Figure 4:
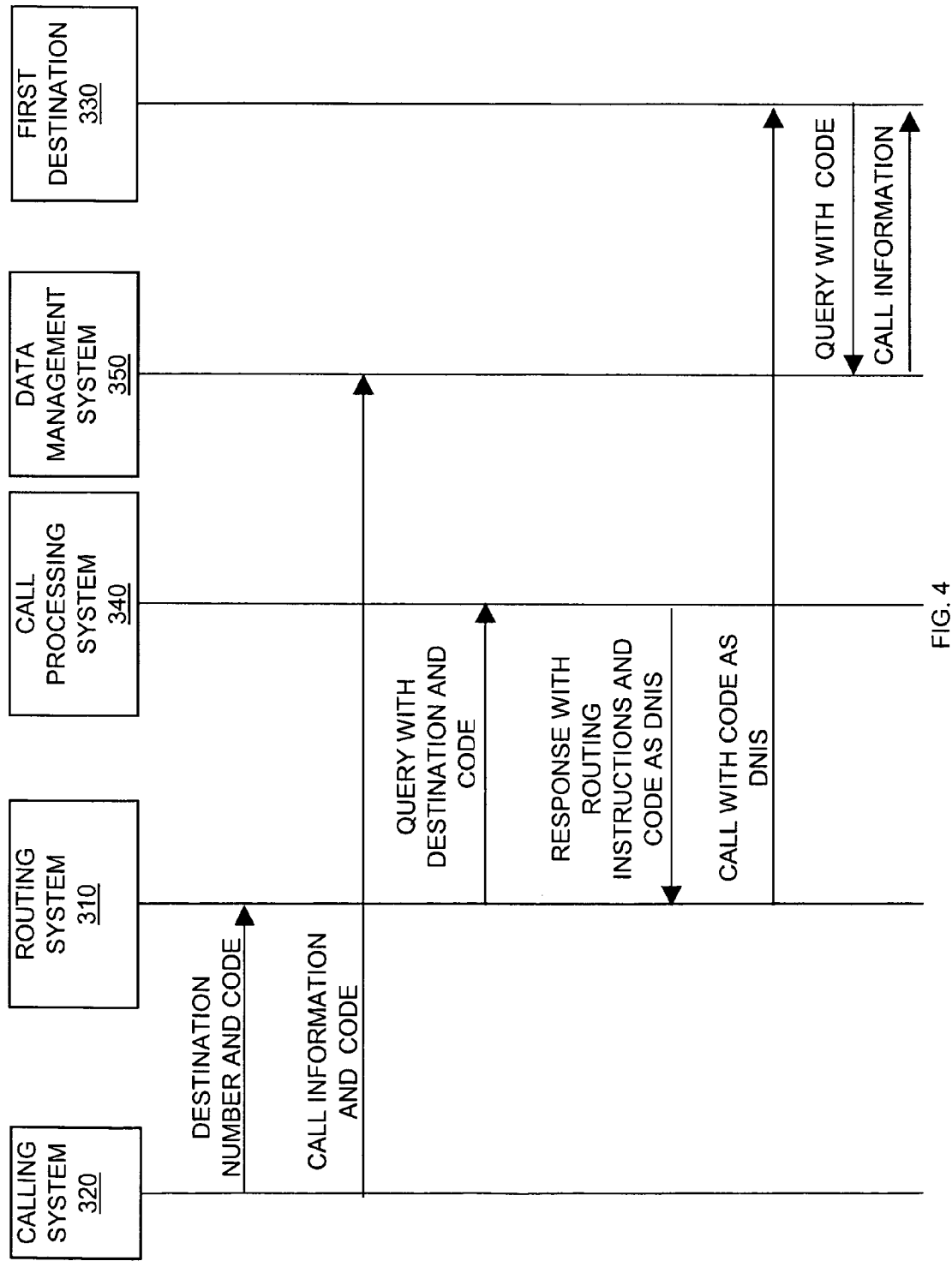
FIG. 4 illustrates the operation of an information correlation system in an example of the invention.

Second Example Configuration and Operation—FIGS. 3-4

FIG. 3 illustrates information correlation system 300 in an example of the invention. Routing system 310 is connected to call processing system 340, calling system 320, and first destination 330. Data management system 350 is connected to calling system 320 and first destination 330. Routing system 310 could include a collection of Public Switched Telephone Network (PSTNs) elements such as a telecommunication switch. Call processing system 340 comprises a Service Control Point (SCP) or similar processing system. Calling system 320 comprises an interactive voice response unit (IVR). First destination 330 comprises an automatic call distribution system (ACD), possibly including a live operator. Data management system 350 comprises a communication interface, a storage system, and a processing system.

FIG. 4 illustrates the operation of information correlation system 300 in an example of the invention. Calling system 320 receives information entered over a call and determines that the call must be transferred based upon the information. Calling system 320 transfers a destination number and a code to routing system 310 and also transfers the information and the code to data management system 350.

Routing system 310 receives the destination number and the code and responsively transfers a query including the destination number to call processing system 340. Call processing system 340 receives the query and processes the destination number to determine routing instructions for the call. Call processing system 340 then transfers a response to routing system 310 wherein routing system 310 routes the call to first destination 330. Routing system 310 also out-pulses the code as DNIS to first destination 330. First destination 330 receives the call and the code.

Upon receiving the call and the code, first destination transfers a query with the code to data management system 350. Data management system 350 receives the query and processes the code to retrieve the information previously entered over the call and transferred from calling system 320. Data management system 350 transfers a response including the information to first destination 330 whereby a live operator at first destination 330 can access the information to interact with a caller over the call.

In this example, the destination number could comprise the first 10 digits of a 14 digit 800 number in the format 800-XXX-XXXX-XXXX wherein the last 4 digits comprise the code. Calling system 320 would post-pend an 800 number with the code to form the 14 digit 800 number and out-dial the 14 digit number to routing system 310 using standard signaling over standard trunks between routing system 310 and calling system 320. Routing system 310 is configured to receive 14 digit numbers.

Alternatively, a virtual private network (VPN) destination number could represent the destination number and the code. Once the calling system determines the call needs to be transfer, the calling system out-dials the VPN destination over a dedicated trunk from calling system 320 to routing system 310. The trunk will have an associated authorization code that will map to a specific set of on-network numbers unique to a service associated with calling system 320. The on-network numbers are maintained in call processing system 340. A first potion of the VPN destination would identify first destination 330. A second portion of the VPN destination could represent the code. For example, the first 3 digits of a 7 digit VPN destination would identify first destination 330 and the last 4 digits would identify the code.

In another alternative, a 700 number could represent the destination number and the code. In such a case, the 700 number would carry the format 700-XXX-XXXX. Digits 4-6 would identify first destination 330 and digits 7-10 would comprise the code. Routing system 310 would decode the 700 number with pre-translations manually entered and supported in routing system 310.

Figure 5:
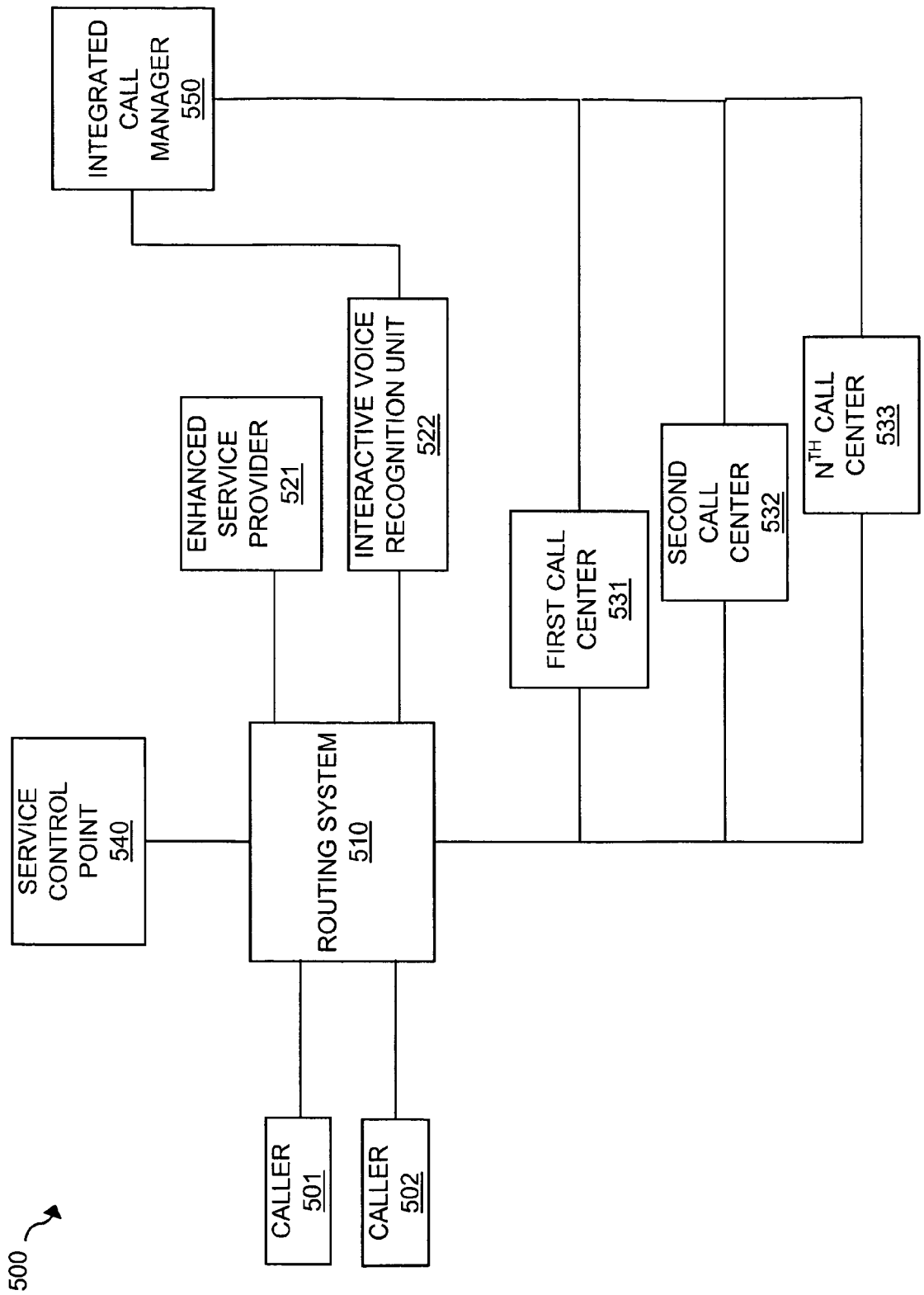
FIG. 5 illustrates an information correlation system in an example of the invention.

Third Example Configuration and Operation—FIG. 5

FIG. 5 illustrates information correlation system 500 in an example of the invention. Routing system 510 is connected to service control point (SCP) 540, first caller 501, second caller 502, enhanced service platform 521 (ESP), interactive voice recognition unit (IVR) 522, first call center 531, second call center 532 and $n^{th}$ call center 533. Integrated call manager (ICM) 550 is connected to IVR 522, first live operator 531, second live operator 532, and $n^{th}$ live operator 533. Routing system 510 could include a collection of Public Switched Telephone Network (PSTNs) elements such as a telecommunication switch. Call centers 531, 532, 533 comprise automatic call distributors (ACDs) and live operators. ICM 550 comprises a communication interface, a storage system, and a processing system.

In operation, routing system 510 connects a call from caller 501 through ESP 521 to IVR 522. ESP 521 monitors the call for call triggers such as a transfer command. IVR 522 interacts with first caller 501 over the call to collect caller information such as a social security number. IVR 522 determines that first caller requires a transfer to a live operator at call centers 531, 532, 533. IVR transmits a transfer command including a destination number and a first code. IVR also transfers the first code and the information collected over the call to ICM 550. ICM 550 stores the information in association with the first code.

ESP 521 recognizes the transfer command and out-dials the destination number and the first code to routing system 510. Routing system 510 receives the destination number and the first code and sends a query to SCP 540 including the destination number. SCP 540 receives the query and processes the destination number to determine routing instructions for the call transfer. SCP 540 determines the routing instructions based on various factors such as the geographical location of first caller 501 or the capacity of call centers 531, 532, 533.

In this example, SCP 540 sends a response to routing system 510 indicating routing instructions to first call center 531. Routing system 510 receives the routing instructions and connects first caller 501 over a second call leg to first call center 531. Routing system 510 also out-pulses the first code as DNIS digits to first call center 531 which transmits a query to ICM 550 with the first code. ICM 550 receives the query and processes the first code to retrieve the associated information previously received from IVR 522. ICM 550 transfers a response including the information to first call center 531. At first call center 531, an ACD routes the call to a live operator for interaction with first caller 501. The live operator can access the information previously entered by first caller 501 rather than re-prompt first caller 501 for the information.

Continuing with this example, second caller 502 initates a call to IVR 522. Routing system 510 routs the call through ESP 521 to IVR 522. IVR collects information from second caller 502 and sends the information and a second code to ICM 550. ICM 550 stores the information in association with the second code. IVR 522 also transmits a transfer command including the destination number and the second code to ESP 521. In this case, the destination number for the call from second caller 502 is the same destination number as for the call from first caller 501. ESP recognizes the transfer command, tears down the call leg to IVR 522, and out-dials the destination number and the second code to routing system 510.

Routing system 510 receives the out-dialed destination number and second code and transfers a query including the destination number to SCP 540. SCP 540 receives the query, processes the destination number to determine routing instructions for the call, and transmits a query response to routing system 510 with the routing instructions. Routing system 510 receives the response and connects second caller 502 to second call center 532. Routing system 510 also out-pulses the second code as DNIS digits to second call center 532 which responsively transmits a query to ICM 550 with the second code. ICM 550 receives the query and processes the second code to retrieve the associated information previously received from IVR 522. ICM 550 transfers a query response including the information to second call center 532.

At second call center 532, an ACD routes the call to a live operator for interaction with second caller 501. By this configuration and operation, the live operator can access the information previously entered by second caller 502 rather than re-prompt second caller 502 for the information. Furthermore, the configuration requires only one destination number rather than a pool of destination numbers as described in the background.

In this example, the destination number could comprise the first 10 digits of a 14 digit 800 number in the format 800-XXX-XXXX-XXXX wherein the last 4 digits comprise the code. IVR 522 would post-pend an 800 number with the code to form the 14 digit 800 number and send an in-band transfer command to ESP 521 with the extended 800 number. ESP would out-dial the 14 digit number to routing system 510 using SS7 signaling over standard trunks between routing system 510 and ESP 521.

Alternatively, a virtual private network (VPN) destination number could represent the destination number and the code. Once IVR 522 determines the call needs to be transferred, IVR 522 sends an in-band message to ESP 521 with the VPN destination. ESP 521 out-dials the VPN destination over a dedicated trunk to routing system 510. The trunk will have an associated authorization code that will map to a specific set of on-network numbers unique to a service associated with ESP 521 and IVR 522. The on-network numbers are maintained in SCP 540. A first potion of the VPN destination would identify first destination 531. A second portion of the VPN destination could represent the code. For example, the first 3 digits of a 7 digit VPN destination would identify first destination 531 and the last 4 digits would identify the code.

In another alternative, a 700 number could represent the destination number and the code. In such a case, the 700 number would carry the format 700-XXX-XXXX. Digits 4-6 would identify first destination 531 and digits 7-10 would comprise the code. Routing system 510 would decode the 700 number with pre-translations manually entered and supported in routing system 510.

Figure 6:
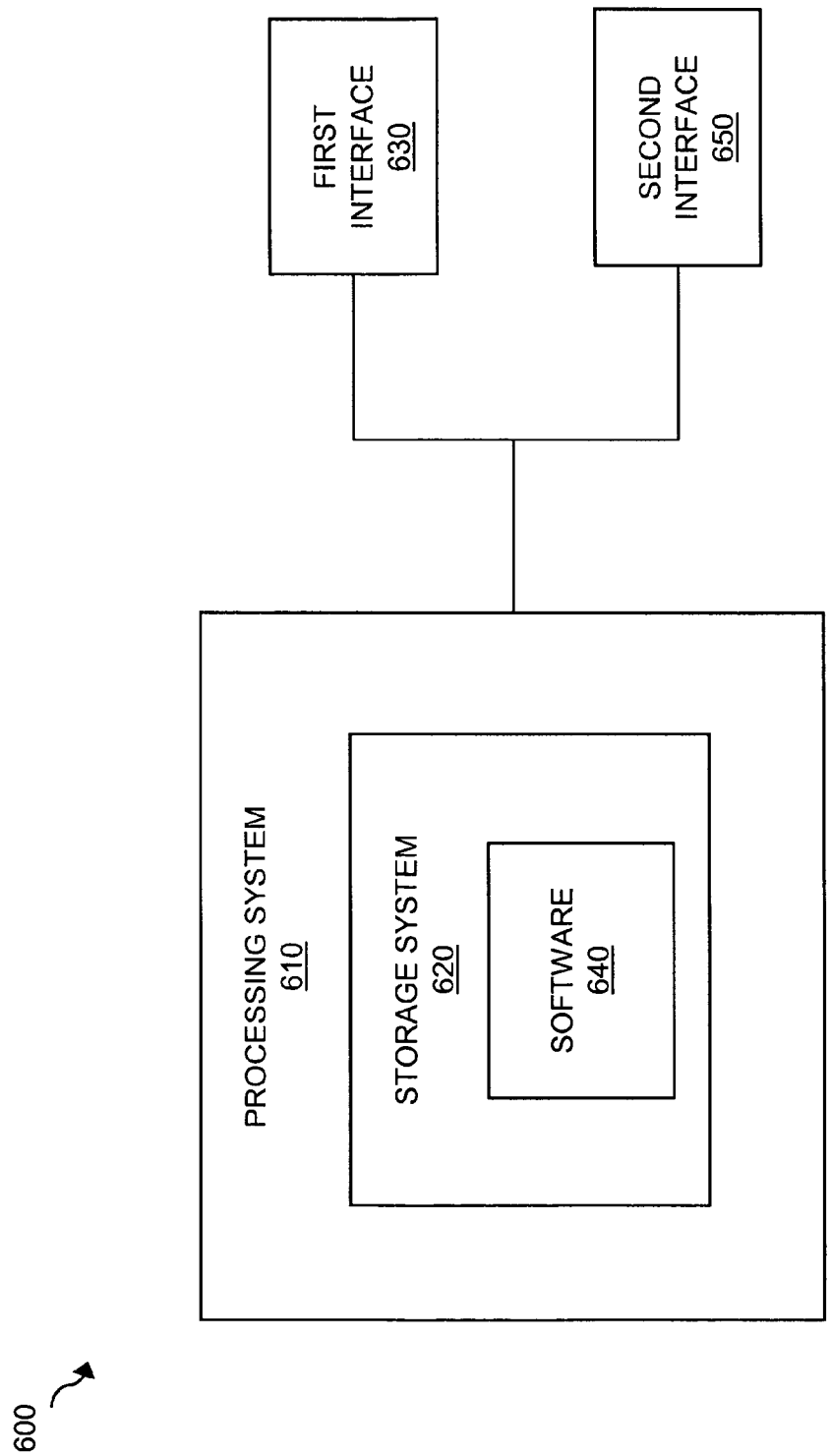
FIG. 6 illustrates a computer system in an embodiment of the invention.

Computer System Configuration—FIG. 6

FIG. 6 illustrates computer system 600 that could be used to implement aspects of the invention. In particular, computer system 600 could be used in information correlation system 100, 300, or 500 and other similar information correlation systems. Computer system 600 includes processing system 610, storage system 620, software 640, first interface 630, and second interface 650. Storage system 620 stores software 640. Processing system 610 is linked to first interface 630 and second interface 650. Computer system 600 could be comprised of programmed general-purpose computers, although those skilled in the art will appreciate that programmable or special purpose circuitry and equipment may be used. Computer system 600 may use a client server architecture where operations are distributed among a server system and client devices that together comprise elements 610-650.

First interface 630 could comprise a network interface card, modem, port, or some other communication device. First interface 630 may be distributed among multiple communication devices. Processing system 610 could comprise a computer microprocessor, logic circuit, or some other processing device. Processing system 610 may be distributed among multiple processing devices. Second interface 650 could comprise a keyboard, mouse, voice recognition interface, microphone and speakers, graphical display, touch screen, or some other type of user device. Storage system 620 could comprise a disk, tape, integrated circuit, server, or some other memory device. Storage system 620 may be distributed among multiple memory devices.

Processing system 610 retrieves and executes software 640 from storage system 620. Software 640 may comprise an operating system, utilities, drivers, networking software, and other software typically loaded onto a general-purpose computer. Software 640 could also comprise an application program, firmware, or some other form of machine-readable processing instructions. When executed by the processing system 610, software 640 directs the processing system 610 to operate as described for information correlation systems 100, 300, and 500.

What is claimed is:

1. A method of operating a communication system, the method comprising:
   receiving a call to a called number that includes a destination number and a correlation code;
   routing the call to a destination based on the destination number but not based on the correlation code;
   transferring the correlation code to the destination with the call;
   receiving a query from the destination indicating the correlation code; and
   in response to the query, retrieving information from a database using the correlation code, and transferring the information to the destination.

2. The method of claim 1 wherein the destination number comprises a ten digit telephone number and the correlation code comprises a number appended to the destination number.

3. The method of claim 1 wherein the destination number comprises a ten digit telephone number and the correlation code comprises a four digit number appended to the destination number.

4. The method of claim 1 wherein the destination number comprises an 800 number.

5. The method of claim 1 wherein transferring the correlation code to the destination with the call comprises transferring Dialed Number Information Service (DNIS) digits to the destination over the call.

6. The method of claim 1 wherein the destination comprises a live operator.

7. The method of claim 1 further comprising collecting the information from a caller placing the call.

8. The method of claim 1 further comprising storing the information in the database in association with the correlation number.

9. The method of claim 1 wherein receiving the call comprises receiving the call from a calling system that comprises an interactive voice response unit.

10. The method of claim 1 wherein receiving the call comprises receiving the call from a prior destination that is transferring the call.

11. A communication system comprising:
    a call processing and routing system configured to receive a call to a called number that includes a destination number and a correlation code, route the call to a destination based on the destination number but not based on the correlation code, and transfer the correlation code to the destination with the call; and
    a data system configured to receive a query from the destination indicating the correlation code, and in response to the query, retrieve information from a database using the correlation code and transfer the information to the destination.

12. The communication system of claim 11 wherein the destination number comprises a ten digit telephone number and the correlation code comprises a number appended to the destination number.

13. The communication system of claim 11 wherein the destination number comprises a ten digit telephone number and the correlation code comprises a four digit number appended to the destination number.

14. The communication system of claim 11 wherein the destination number comprises an 800 number.

15. The communication system of claim 11 wherein the call processing and routing system is configured to transfer the correlation code to the destination with the call by transferring Dialed Number Information Service (DNIS) digits to the destination over the call.

16. The communication system of claim 11 wherein the destination comprises a live operator.

17. The communication system of claim 11 further comprising an interactive voice response unit configured to collect the information from a caller placing the call.

18. The communication system of claim 11 wherein the data system is configured to store the information in the database in association with the correlation number.

19. The communication system of claim 11 wherein the call processing and routing system is configured to receive the call from a calling system that comprises an interactive voice response unit.

20. The communication system of claim 11 wherein the call processing and routing system is configured to receive the call from a prior destination that is transferring the call.

* * * * *